Aug. 1, 1967 — R. W. SARGENT — 3,334,203

FLUID DISPLACEMENT SENSOR DEVICE

Filed Sept. 7, 1965 — 2 Sheets-Sheet 1

INVENTOR.
Raymond W. Sargent
BY Edwin E. Greigg
—ATTY—

FLOW DIAGRAM

United States Patent Office 3,334,203
Patented Aug. 1, 1967

3,334,203
FLUID DISPLACEMENT SENSOR DEVICE
Raymond W. Sargent, Burlington, Vt., assignor to Simmonds Precision Products, Inc., Tarrytown, N.Y., a corporation of New York
Filed Sept. 7, 1965, Ser. No. 485,372
8 Claims. (Cl. 200—82)

ABSTRACT OF THE DISCLOSURE

A fluid displacement sensor device comprising a piston-type motor, a reversing valve therefor, and a snap-action device interposed between the valve and piston and set into operation by the piston upon reaching a certain and predetermined point in its stroke to reverse the valve and thereby the piston. A magnet is connected to the movable member of the valve and a reed switch is located close to the path of the magnet. Reciprocation of the magnet operates the reed switch to send out pulses to a counter-means whereby the reciprocations and displacement of the piston may be counted.

---

The invention relates to an instrument responsive to a predetermined volume of liquid.

It is an object of the invention to provide an improved instrument responsive to a predetermined volume of liquid.

It is another object of the invention to provide an instrument which produces an electrical signal in response to the sensing of a predetermined volume of liquid.

It is a further object of the invention to provide an instrument arranged for connection in series with a circuit in which liquid is flowing, the instrument producing an electrical indication each time a predetermined volume of the liquid has passed through the instrument. Such an instrument may readily be coupled with a counter for counting the number of electrical indications in a given time so as to indicate rate of flow of the liquid in the said circuit.

According to the invention there is provided a liquid volume responsive instrument comprising a body, a hollow cylinder mounted on the body having a closed end and a communicating liquid inlet and outlet, a piston slidable in the cylinder, and signal-producing output means mounted on the body and operative only when the piston has moved to a predetermined position remote from said closed end of said cylinder.

Figure 1:
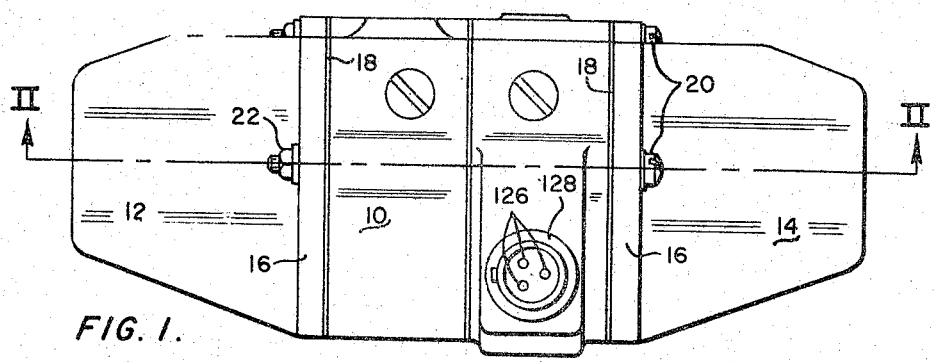
Figure 2:
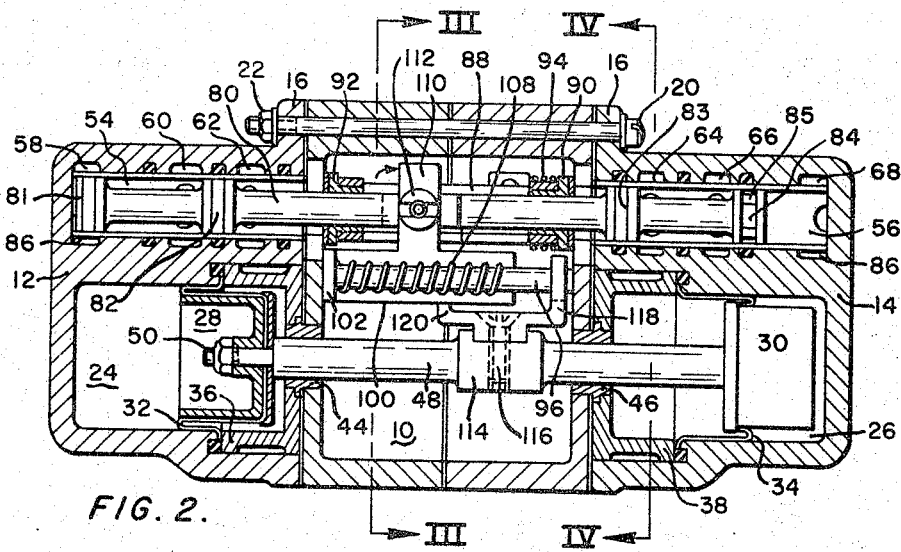
Figure 3:
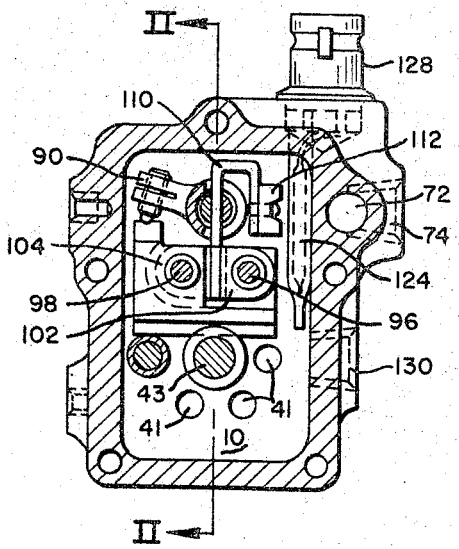
Figure 4:
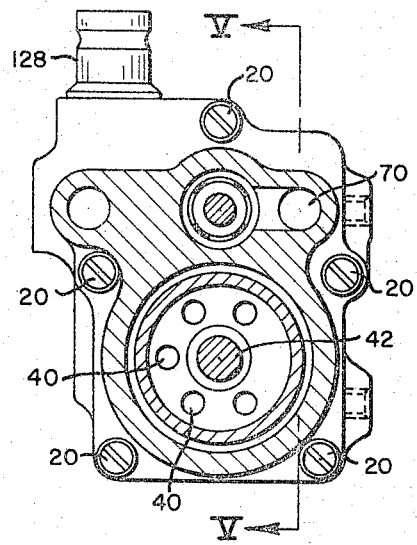
Figure 5:
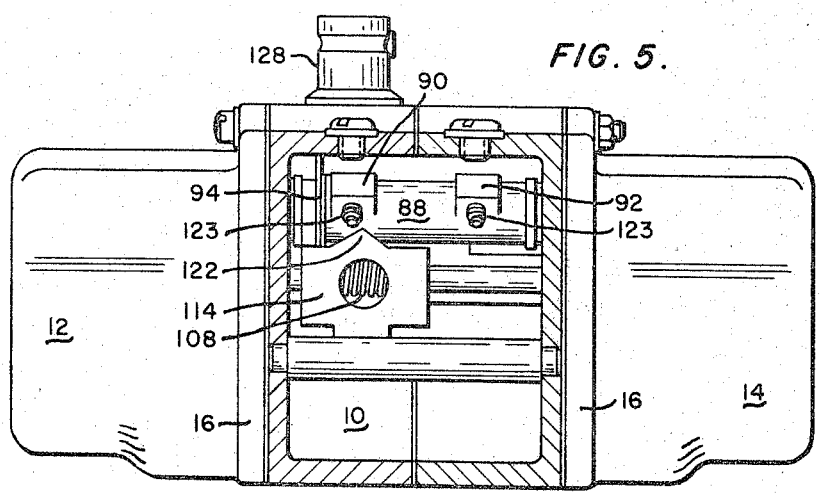
Figure 6:
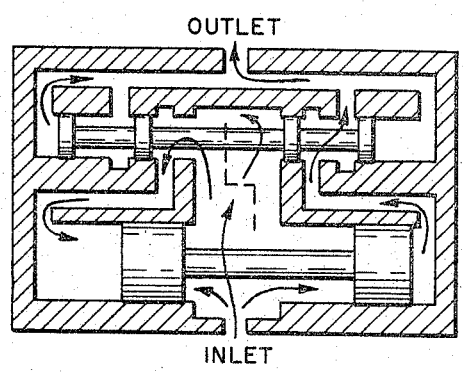

A liquid volume responsive instrument embodying the invention will now be described by way of example and with reference to the accompanying drawings in which:

FIGURE 1 is a plan view of the instrument;
FIGURE 2 is a sectional side elevation of the instrument on the line II—II of FIGURE 1;
FIGURE 3 is a sectional end elevation of the instrument taken on the line III—III of FIGURE 2;
FIGURE 4 is a sectional end elevation of the instrument taken on the line IV—IV of FIGURE 2;
FIGURE 5 is a sectional side elevation of the instrument taken on the line V—V of FIGURE 4; and
FIGURE 6 is a diagrammatic sectional side elevation of the instrument showing liquid flow paths.

The instrument comprises a body assembly built up from a central hollow aluminum portion 10 and two cylindrical end portions 12 and 14. Each cylindrical end portion 12 and 14 has a peripheral flange 16 which abuts against a respective gasket 18 in contact with an end of the central portion 10. The end portions 12 and 14 are secured to the central portion 10 by means of five bolts 20 which pass through the flanges 16 and channels in the central portion 10 and engage with lock nuts 22.

Each cylindrical end portion 12, 14, defines a cylindrical space 24, 26 (FIG. 2). Pistons 28 and 30 respectively slide in these cylindrical spaces and each piston is connected to the wall of the cylindrical space by a rolling diaphragm 32, 34 which provides a liquid-tight seal. Spools 36 and 38 respectively are positioned in the cylindrical spaces 24 and 26 and clamped to the rolling diaphragms 32 and 34. The bases of the spools abut against the respective end walls of the hollow central portion 10 and have a series of through holes 40 (FIG. 4) which communicate with similarly orientated holes 41 (FIG. 3) in the end walls of the central portion 10. Each spool also has means defining a central hole aperture 42 (FIG. 4) communicating with a similar aperture 43 (FIG. 3) in the end wall of the central portion 10; the apertures 42 and 43 contain bushings 44, 46, providing a sliding accommodation for a piston rod 48 which extends between the two pistons 28, 30, and to which it is attached by nuts 50.

Each cylindrical end portion 12, 14, also defines a cylindrical valve chamber 54, 56, which has an open end communicating with the space defined by the central portion 10. Each valve chamber 54, 56, has three ports 58 to 68. The ports 58 and 60, and the ports 66 and 68, communicate with an outlet passage 70 (FIGURE 4) which extends through each end portion 12, 14 parallel to the respective valve chambers 54, 56, therein, and is aligned with an outlet passage 72 (see FIG. 3) in the central portion 10. The passage 72 has a junction with an outlet bore 74. The ports 62 and 64 respectively communicate with the closed end of the cylindrical spaces 24 and 26 by means of passages not shown.

A slide valve 80 is mounted for moving in the valve chambers 54 and 56 and has flanges 81, 82, 83 and 84 provided with sealing rings 85 which co-operate with a liner 86 in each valve chamber 54, 56 to provide a liquid-tight seal.

The slide valve 80 is arranged to be freely movable through a concentric sleeve 88 which extends across the hollow internal space of the central portion 10. Sleeve 88 has end bushings 90 which abut against the end walls of the central portion 10 and through which the slide valve 80 passes. The sleeve 88 has two integral rocker arms 90 and 92 (see FIGS. 3 and 5) by means of which it can be rotated, about the axis of the slide valve, between a locking position in which it prevents the slide valve 80 from moving longitudinally and a free position in which it permits such movement. A torsion spring 94 biases the sleeve 88 into the locking position.

The hollow space of the central portion 10 contains two guide rails 96, 98, which extend between the end walls of the portion 10. A shuttle 100 has two staggered arms 102 and 104 which slide on the guide rails 96, 98, respectively. The arms 102 and 104 are spaced apart in the direction of the axes of the guide rails 96 and 98. As shown in FIGURE 2, the shuttle 100 is positioned so that the arm 102 is abutting against the left hand end wall of the central portion 10; in this position of the shuttle, the other arm 104 is close to, but spaced from, the other end wall of the central portion 10. A compression spring 108 is mounted on each guide rail 96, 98. The shuttle 100 has an upstanding bracket 110 which passes through a hole in the slide valve 80 and a slot in the concentric sleeve 88, and is bent over to support a permanent magnet 112. The shuttle is attached to the slide valve 80 by the bracket 110 and therefore can only move when the sleeve 88 is in the free position.

The central portion of the piston rod 48 is formed to receive a yoke member 114 which is attached to the piston rod by means of a screw 116. The yoke member 114 has two upstanding forked arms 118, 120 which respectively straddle the guide rails 96 and 98 to contact springs 108 thereon. As shown in FIGURE 2, the forked arms 118 and 120 are spaced apart in the direction of the axes of the guide rails 96 and 98. The yoke member 114 also carries (see FIG. 5) a cam-shaped portion 122 which is so positioned as to engage set screws 123 on the rocker arms 90 and 92 as the yoke member slides to and fro, in a manner to be explained, with the piston rod 48.

A reed switch 124 (FIG. 3) is mounted within the hollow space of the central portion 10 towards one end wall thereof. The reed switch 124 contains electrical contacts which are closed by movement of the permanent magnet 112 into a predetermined adjacent position and which are connected to pins 126 (FIG. 1) in a connection plug 128 mounted on the top of the central portion 10.

A liquid inlet bore 130 (FIG. 3) extends from the outside of the central portion 10 into the hollow space thereof.

The operation of the instrument will now be described with the aid of the diagrammatic view in FIGURE 6, it being assumed that the instrument is connected, by means of the inlet bore 130 and the outlet bore 74, in series with the path of the liquid whose quantity is to be measured. It is also assumed that the contacts in the reed switch 124 are connected in an electric circuit by means of the plug 128. With the slide valve 80 locked by the sleeve 88 into the position illustrated in FIGS. 2 and 6, and the pistons 28 and 30 in the positions opposite to that illustrated in FIGS. 2 and 6, liquid enters the inlet bore 130 and passes into the hollow space of the central portion 10. Because of the position of the slide valve 80, the flange 83 prevents the liquid from entering the valve chambers 56. The liquid can, however, enter the valve chamber 54 and flows from there into the cylindrical space 24 through the port 62. This liquid flow moves the pistons 28 and 30 from left to right into the position shown in FIGURE 2. Liquid contained in cylindrical space 26 is forced out therefrom into the valve chamber 56 through the port 64. Because of the respective positions of the valve flanges 83 and 84, this liquid flowing into the valve chambers 56 through the port 64 can flow out through the port 66 into the outlet passage 70 (FIG. 4) in the end portion 14 and into the corresponding outlet passage 72 in the central portion 10; from there it flows out through the outlet bore 74. The flow paths described are illustrated by the arrows in FIGURE 6.

Movement of the pistons 28 and 30 from left to rght will carry the piston rod 48 and the yoke 114 in the same direction into the position illustrated in FIG. 2. The forked arm 118 of the yoke 114 will therefore move along the guide rail 96 away from the compression spring 108 thereon. The forked arm 120 will, however, move along the guide rail 98 towards the spring 108 thereon and will compress the spring against the arm 104 (FIG. 3) of the shuttle 100. As the slide valve 80 is locked against movement, so is the shuttle 100. As the yoke member 114 continues its movement to the right with the piston rod 48, the cam portion 122 engages the downwardly depending set screw 123 on the rocker arm 90 (see FIG. 5) and raises this rocker arm rotating the concentric sleeve 88 into the free position in which it permits sliding movement of the slide valve 80 and the shuttle 100. When the sleeve 88 has been rotated into the free position, the energy stored in the compressed spring 108 on the guide rail 98 is suddenly released and rapidly moves the shuttle 100 to the right carrying the slide valve 80 and the permanent magnet 112 with it. The permanent magnet 112 therefore moves into close proximity with the reed switch 124 closing the contacts therein. An electric circuit is therefore completed through these closed contacts and, by means obvious to those skilled in the art, an electrical signal is produced in the circuit connected to the contacts through the connection plug 128.

When the energy stored in the compressed spring 108 on the guide rail 98 is released, the slide valve 80 moves to its extreme right hand position (that is, the position opposite to that shown in FIG. 2). In this right hand position, the valve flange 82 prevents liquid flowing into the inlet bore 130 from passing into the valve chamber 54. The valve flange 83 will, however, now be in a position in which it permits liquid to flow from the internal space of the central portion 10 into the valve chamber 56 and thence through the port 64 into the cylindrical space 26. This liquid flow will force the pistons 30 and 28 from right to left as viewed in FIGURE 2. The liquid in the cylindrical space 24 will be forced out by the movement of the piston 28 to the left, and will flow through the port 62 into the valve chamber 54. As the slide valve 80 is in its extreme right hand position, the valve flanges 81 and 82 will direct this liquid from the valve chamber 54 out through the port 60 into the outlet passage 70 in the end portion 14. From there it will flow into the corresponding passage 72 in the central portion 10 and out through the outlet bore 74.

As the pistons 28 and 30 move from right to left in this manner, the piston rod 48 and the yoke member 114 move similarly. As the yoke member 114 moves in this way, the cam portion 122 (FIG. 5) will move away from the rocker arm 90 allowing the sleeve 88 to rotate under the influence of the spring 94 into the locking position so as to prevent any sliding movement of the slide valve 80 and the shuttle 100; the slide valve 80 therefore remains in its extreme right hand position (that is, the position opposite to that shown in FIG. 2). Continued movement from right to left (FIG. 2) of the pistons 28 and 30 causes the spring 108 on the guide rail 96 to be compressed by the forked arm 118 on the yoke member 114. The spring 108 is compressed against the arm 102 of the shuttle which, it will be appreciated, is spaced from the left hand end wall of the central portion 10 at this stage because the slide valve 80 and the shuttle 100 have been moved to the right hand position. As the pistons 28 and 30 continue to move from right to left, the yoke member 114 moves therewith causing the cam portion 122 to engage the set screw 123 on the rocker arm 92 (see FIG. 5). The cam portion 122 therefore lifts the rocker arm 92 rotating the sleeve 88 into the free position in which it permits movement of the slide valve 80 and the shuttle 100. When the sleeve 88 is rotated into the free position in this way, the stored energy in the spring 108 on the guide rail 96 is suddenly released and rapidly moves the shuttle 100 from right to left (that is, into the position illustrated in FIG. 2). This movement of the shuttle 100 carries the slide valve 80 with it as well as the permanent magnet 112. The magnet therefore moves away from the reed switch 124, causing the contacts therein to be opened. The slide valve 80 is now in the position illustrated in FIG. 2 and liquid flowing in through the inlet bore 130 can once more pass through the valve chamber 54 into the cylindrical space 24 to drive the pistons 28 and 30 from left to right.

From the above description, it will be seen that continuous liquid flow into the inlet bore 130 causes the pistons 28 and 30 to reciprocate in their respective cylindrical spaces 24 and 26. By means of the sleeve 88 controlling the locking of the shuttle and the slide valve, the contacts in the reed switch 124 are operated (that is, opened or closed) each time the pistons are displaced by a predetermined, accurately known, quantity of the fluid. A count of the number of electrical signals produced by the contacts in the reed switch 124 therefore provides an accurate measure of the quantity of liquid which is passed through the instrument. A count of the number of electrical signals produced in a given time provides an accurate measure of the rate of flow of the liquid through the instrument.

Although there has been shown what is considered to be a preferred embodiment of the invention, it will be evident that many changes and modifications may be made without departing from the essential spirit of the invention. It is intended, therefore, in the annexed claims to cover all such changes and modifications as fall within the scope of the invention.

What I claim is:

1. A liquid volume responsive instrument, comprising:
   a body assembly defining a hollow cylinder having a communicating liquid inlet and outlet,
   a piston in sealing relation with and slidable in the cylinder in a first direction in response to liquid entering the cylinder and in a second, opposite, direction,
   an output member mounted on the body assembly for movement relative to the cylinder,
   releasable locking means mounted on the body assembly for preventing said movement of said output member,
   resilient energy storing means mounted on the body assembly between the piston and the output member for storing energy when the piston moves in the said first direction,
   releasing means coupled to said locking means and operable by the piston when it has moved a predetermined distance in the said first direction for releasing the locking means,
   and signal-producing means mounted on the body assembly responsive to movement of said output member when the stored energy is released.

2. An instrument according to claim 1, in which the said signal producing means comprises a permanent magnet carried by said output member,
   and a reed switch mounted on the body assembly to be influenced by said permanent magnet when said output member moves.

3. A liquid volume responsive instrument comprising:
   a hollow body assembly defining at least one internal cylindrical space and a liquid inlet and outlet passage communicating with the cylindrical space, the body assembly also defining a liquid inlet bore and a liquid outlet bore each extending from the outside to the inside of the body assembly and an internal valve space communicating with the liquid inlet and outlet passage and with the liquid inlet bore and the liquid outlet bore,
   the instrument also comprising a slide valve slidable in the said valve space between a position in which it permits liquid flow between the liquid inlet and outlet passage and the liquid inlet bore and a position in which it permits liquid flow between the liquid inlet and outlet passage and the liquid outlet bore,
   a close-fitting piston assembly slidable in the cylindrical space,
   a piston rod connected to the piston,
   guide means mounted internally of the body assembly,
   a shuttle mounted for sliding on the guide means and attached to the said slide valve,
   a yoke member attached to the piston rod,
   a compression spring extending between the yoke member and the shuttle,
   a sleeve mounted coaxially with the slide valve and rotatable about the axis of the slide valve between a locking position in which it locks the slide valve and the shuttle against movement so that sliding of the piston in response to liquid entering the cylindrical space compresses the said spring and a free position in which it permits movement of the slide valve and shuttle in response to release of stored energy from said spring,
   a rocker arm rigidly attached to the sleeve,
   a torsion spring urging said sleeve into said locking position,
   cam means carried by said yoke member for engaging the said rocker arm when the piston has moved to a predetermined position to rotate said sleeve into said free position,
   a reed switch mounted internally of said body assembly,
   a permanent magnet carried by said shuttle and arranged to move into close proximity with said reed switch when said shuttle moves in response to release of said stored energy,
   and a pair of contacts in said reed switch adapted to be operated by close proximity of the permanent magnet.

4. A liquid volume responsive instrument comprising:
   a hollow body assembly defining two internal axially spaced co-axial cylindrical spaces and two liquid inlet and outlet passages respectively communicating with the cylindrical spaces, the body assembly also defining a liquid inlet bore and a liquid outlet bore each extending from the outside to the inside of the body assembly,
   the instrument also comprising valve means mounted internally of the body assembly and movable between a position in which it permits liquid flow between one said liquid inlet and outlet passage and the liquid inlet bore and between the other said liquid inlet and outlet passage and the liquid outlet bore, and a position in which it permits liquid flow between the said other liquid inlet and outlet passage and the liquid inlet bore and between the said one liquid inlet and outlet passage and the liquid outlet bore,
   two pistons respectively slidable in the cylindrical spaces,
   a rolling diaphragm connected between each piston and the portion of the body assembly defining its respective cylindrical space,
   a common piston rod interconnecting the two pistons,
   guide means mounted internally of the body assembly,
   a shuttle mounted for reciprocation on the guide means and attached to the said valve means,
   a yoke member attached to the piston rod,
   a first compression spring mounted to extend in one direction between the yoke member and the shuttle and a second compression spring mounted to extend in the opposite direction between the yoke member and the shuttle,
   locking means mounted on the body assembly and movable between a locking position in which it locks the slide valve and the shuttle against movement in the line of reciprocation so that sliding of the pistons in response to liquid entering one cylindrical space compresses a said spring and a free position in which it permits said reciprocation of the slide valve and shuttle in response to release of stored energy from a said spring,
   cam following means attached to the locking means,
   spring means urging said locking means into said locking position,
   cam means moving with said piston rod for operating said cam following means when the pistons have moved to a predetermined position and for moving said locking means into said free position,
   a reed switch mounted in said body assembly,
   a permanent magnet carried by said shuttle and arranged to move into close proximity with said reed switch when said shuttle moves in response to release of said stored energy,
   and a pair of contacts in said reed switch adapted to be operated by close proximity of the permanent magnet.

5. A liquid volume responsive instrument comprising a body having a central hollow portion, a first closed cylinder adjacent one side thereof, and a second cylinder adjacent the other side thereof and in alignment with the first cylinder, each cylinder having an apertured inner end adjacent the central portion and an outer end,
   a piston in each cylinder,
   a common piston rod traversing the central portion, passing through the apertured inner ends and connecting both pistons for joint movement,
   a valve bore within the body, a fluid inlet and a fluid outlet connected at spaced points to said bore, cylinder passage means connecting the outer end of each cylinder with the valve bore at spaced points thereof, a valve member movable in said bore into first and second positions in which it alternately and reversely forms communication between the fluid inlet and one cylinder passage means and between the fluid outlet and the other cylinder passage means to cause reciprocatory movement of the pistons by the action of the fluid, a shuttle mounted on the body for reciprocation relative to said cylinders, means rigidly interconnecting said shuttle with said valve member, releasable locking means mounted on the body and movable between a locking position in which reciprocation of said shuttle is prevented and a free position in which said reciprocation is permitted, means biasing said locking means into said locking position, spring means mounted on the body between said shuttle and said piston rod for storing energy in response to each said piston moving to a predetermined position, and releasing means mounted on the body to be operated when each said piston moves into its said predetermined position for moving said locking means into its free position to release said energy stored in said spring means, said signal producing output means including means operative in response to said shuttle and said valve member moving along the line of said reciprocation when said energy stored in said spring means is released.

6. An instrument according to claim 5, in which said signal producing output means comprises a permanent magnet mounted on said shuttle, an electrical reed switch fixedly mounted on said body so as to be in close proximity to said permanent magnet when said shuttle is at one end of its line of reciprocation, and a pair of contacts in said reed switch adapted to be operated by said close proximity of said permanent magnet.

7. A liquid volume responsive instrument comprising:

a hollow body assembly defining two internal axially spaced co-axial cylindrical spaces and two liquid inlet and outlet passages respectively communicating with the cylindrical spaces, the body assembly also defining a liquid inlet bore and a liquid outlet bore each extending from the outside to the inside of the body assembly and an internal valve space communicating with the two liquid inlet and outlet passages and with the liquid inlet bore and the liquid outlet bore, the instrument also comprising a slide valve slidable in the said valve space between a first position in which it permits liquid flow between one said liquid inlet and outlet passage and the liquid inlet bore and between the other said liquid inlet and outlet passage and the liquid outlet bore, and a second position in which it permits liquid flow between the said other liquid inlet and outlet passage and the liquid inlet bore and between the said one liquid inlet and outlet passage and the liquid outlet bore, two pistons respectively slidable in the two cylindrical spaces, a common piston rod interconnecting the two pistons, two parallel side-by-side guide rails mounted internally of the body assembly, a shuttle mounted for sliding on the two guide rails and attached to the said slide valve, a yoke member attached to the piston rod and having two yoke arms each slidable on a respective said guide rail, a first compression spring mounted on one guide rail and extending in one direction between the respective yoke arm and the shuttle, a second compression spring mounted on the other guide rail and extending in the opposite direction between the respective yoke arm and the shuttle, a sleeve mounted coaxially with the slide valve and rotatable about the axis of the slide valve between a locking position in which it locks the slide valve and the shuttle against movement so that sliding of the pistons in response to liquid entering one cylindrical space compresses a said spring and a free position in which it permits movement of the slide and shuttle in response to release of stored energy from a said spring, a pair of rocker arms rigidly attached to the sleeve and spaced apart along the axis of the slide valve, a torsion spring urging said sleeve into said locking position, cam means carried by said yoke member for engaging a said rocker arm when the pistons have moved to a predetermined position to rotate said sleeve into said free position, a reed switch mounted internally of said body assembly, a permanent magnet carried by said shuttle and arranged to move into close proximity with said reed switch when said shuttle moves in response to release of said stored energy, and a pair of contacts in said reed switch adapted to be operated by close proximity of the permanent magnet.

8. An instrument according to claim 7, in which said body assembly comprises:

a hollow central portion, two hollow end portions, and fixing means for securing said central portion between said end portions.

References Cited

UNITED STATES PATENTS

| | | | |
|---|---|---|---|
| 2,244,007 | 6/1941 | Harrington et al. | 200—82 |
| 2,568,008 | 9/1951 | Jansson | 200—82 |
| 3,112,189 | 12/1963 | Porwancher | 260—81.9 |

BERNARD A. GILHEANY, *Primary Examiner.*

H. BROOME, *Assistant Examiner.*